United States Patent [19]

Scott, Jr. et al.

[11] Patent Number: 4,709,003
[45] Date of Patent: Nov. 24, 1987

[54] ALKYLATED TRIAMINES AND HIGHER POLYAMINES AS CURING AGENTS IN POLYURETHANE MANUFACTURE

[75] Inventors: Ray V. Scott, Jr., Addison; William M. Baumann, Downers Grove; David W. House, Arlington Heights, all of Ill.

[73] Assignee: UOP Inc., Des Plaines, Ill.

[21] Appl. No.: 836,872

[22] Filed: Mar. 6, 1986

[51] Int. Cl.$^4$ .............................................. C08G 18/32
[52] U.S. Cl. ...................................... 528/60; 521/159
[58] Field of Search ......................... 521/159; 528/60; 564/330, 331

[56] References Cited

U.S. PATENT DOCUMENTS

| | | | |
|---|---|---|---|
| 3,634,275 | 1/1972 | Sundholm | 564/330 |
| 4,089,901 | 5/1978 | Ziemek et al. | 564/330 |
| 4,578,446 | 3/1986 | House | 528/64 |

OTHER PUBLICATIONS

Product Report, "Curithane 103"—brochure of the Upjohn Co., Jul. 15, 1966.

*Primary Examiner*—Veronica P. Hoke
*Attorney, Agent, or Firm*—Thomas K. McBride; John F. Spears, Jr.; Eugene I. Snyder

[57] ABSTRACT

Largely alkylated polyamines which may be viewed as low molecular weight polymers of x-amino-y-methylenephenyl are effective curing agents for a diverse class of urethane prepolymers. The resulting polyurethanes are thermosetting polymers with excellent compression set and tensile strength. Because the properties of the resulting polyurethane vary only slightly near the optimum stoichiometry of curing agent-prepolymer, the use of the curing agents of this invention presents the advantage of being very tolerant of operator mixing error.

26 Claims, No Drawings

ALKYLATED TRIAMINES AND HIGHER POLYAMINES AS CURING AGENTS IN POLYURETHANE MANUFACTURE

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of cheap fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears, and drive wheels.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric alcohols. A large class of such prepolymers are approximately 2:1 adducts of a diisocyanate, OCN—Y—NCO, and a diol, HO—Z—OH, whose resulting structure is OCN—Y—NHCO$_2$—Z—O$_2$CNH—Y—NCO. Although Y is susceptible of great variety, usually being a divalent alkyl, cyclohexyl, or aromatic radical, in fact the most available prepolymers are made from toluene diisocyanate (TDI), most readily available as a mixture of 2,4- and 2,6-isomers which is rich in the former isomer, or methylene-4,4'-diphenylisocyanate (MDI). The diols used display a greater range of variety; Z may be a divalent alkyl radical (i.e., an alkylene group), and the diols frequently are ethers or esters which are the condensation products of glycols with alkylene oxides or dicarboxylic acids, resp.

The polyurethane elastomers are formed by curing the prepolymer. Curing is the reaction of the terminal isocyanate groups of the prepolymer with active hydrogens of a polyfunctional compound so as to form high polymers through chain extension and, in some cases, crosslinking. Diols, especially alkylene diols, are the most common curing agents for MDI-based prepolymers, and representing such diols with the structure HO—X—OH, where X is an organic moiety, most usually an alkylene group, the resulting polymer has as its repeating unit,

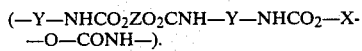

(—Y—NHCO$_2$ZO$_2$CNH—Y—NHCO$_2$—X—O—CONH—).

Where a triol or a higher polyhydric alcohol is used crosslinking occurs to afford a nonlinear polymer.

Although other polyfunctional chemicals, especially diamines, are theoretically suitable, with but a few exceptions none have achieved commercial importance as a curing agent. The major exception is 4,4'-methylene-di-ortho-chloroaniline, usually referred to as MOCA, a curing agent which is both a chain extender and a crosslinker. TDI-based prepolymers typically are cured with MOCA, and the resulting products account for perhaps most of the polyurethane elastomer market. One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material to be cast into molds. This property is conventionally referred to as pot life. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with *some* prepolymers as to afford a desirable pot life, hence the use of, for example, MOCA as a curing agent for TDI-based prepolymers. However, MOCA and other of the aforementioned diamines still remain too reactive to be used, for example, with MDI-based prepolymers.

Although only primary aromatic diamines seem to have been investigated heretofore as curing agents, recently it was discovered that certain N,N'-dialkyl-4,4'-methylenedianilines are generally effective curing agents for a broad range of urethane prepolymers. See U.S. Pat. No. 4,578,446. The resulting polyurethanes often have the advantage of being thermoplastic rather than thermosetting, thereby making them especially useful as coatings, adhesives, and sealants. The secondary aromatic diamines of that invention had commercially acceptable pot lives as curing agents for many prepolymers, and afforded products with an impressive variety of properties.

The use of chain extenders, such as are the secondary aromatic diamines of the aforementioned invention, often leads to thermoplasticity, whereas the use of crosslinkers often leads to increased rigidity and lower compression set as well as a higher glass transition temperature and less swelling in solvents. It occurred to us that the use of aromatic polyamines, especially those that are extensively polyalkylated so as to be predominantly secondary aromatic polyamines, would be particularly advantageous curing agents, because the presence of more than two amino groups within the molecule would lead to crosslinking superimposed on chain extension. In fact, we have demonstrated this to be the case. In particular, we have found a large class of alkylated aromatic polyamines, which can be viewed as polymers whose repeating unit is x-amino-y-methylenephenyl, are excellent curing agents for urethane prepolymers. Among the advantages of the curing agents of this invention are that the resulting polyurethanes show excellent compression set, have quite high tensile strength, show a substantially higher glass transition temperature than usual with good solvent resistance. The resulting polyurethanes are thermosetting polymers, and also have the advantage that their properties remain relatively unchanged within a wide range of stoichiometry of curing agent and prepolymer. Therefore, the curing agents of this invention are very tolerant to mixing error, which is a decided manufacturing advantage. Additionally, the curing agents themselves for the most part are viscous liquids, rather than being powders, an advantage in their handling. The curing agents may be used for both TDI and MDI prepolymers, which are the two largest class of urethane prepolymers, show a good pot life and have excellent thermostability. In short, the unique properties of both the curing agents and the resulting polyurethanes make each very highly desirable.

SUMMARY OF THE INVENTION

The object of this invention is to prepare polyurethanes using alkylated aromatic polyamines as curing agents. In an embodiment the curing agent is a largely alkylated polymer whose repeating unit is x-amino-y-methylenephenyl, where the alkyl group contains up to about 20 carbon atoms. In a more specific embodiment the polyamine has at least two-thirds of its amino groups alkylated. In a still more specific embodiment, the curing agent has from 1-10 repeating units. Other objects and embodiments will become obvious from the description which follows.

DESCRIPTION OF THE INVENTION

In one aspect the invention herein is a method of making polyurethanes by curing a diisocyanate-terminated urethane prepolymer with a largely alkylated aromatic polyamine. In another aspect the invention is the polyurethane resulting from the reaction of such isocyanate-terminated urethane prepolymers with the aforementioned aromatic polyamine.

The urethane prepolymers used in the practice of this invention are isocyanate-terminated adducts of a polyisocyanate and polyhydric alcohols. Prepolymers which are adducts of diisocyanates and dihydric alcohols, or diols, are the most commonly used prepolymers in commerce today and will be used to exemplify and illustrate urethane prepolymers generally. However, it is to be clearly understood that this invention is applicable to urethane prepolymers generally, and should not be restricted to those prepolymers arising from diisocyanates and diols. As examples of such polyisocyanates may be cited the toluene diisocyanates, m-phenylene diisocyanate, tetramethylene diisocyanate, 1,6-hexamethylene diisocyanate, 1,4-cyclohexylene diisocyanate, 4,4'-methylene-dicyclohexyl diisocyanate, 4,4'-methylenediphenyl diisocyanate, 3,3'-dimethyl-4,4'-diphenylmethane diisocyanate, and 1,5-tetrahydronaphthalene diisocyanate. As stated previously, TDI and MDI are currently the preferred diisocyanates in urethane prepolymers.

Among the diols frequently used in making urethane prepolymers are alkylene diols, such as ethylene glycol, 1,3-propylenediol, 1,4-butylenediol, and so forth. Diolethers and diolesters find widespread use in making urethane prepolymers. The diolethers, as exemplified by poly(alkyleneoxy) diols, are typically condensation products of alkylene oxides with glycols or water, with the number of alkyleneoxy groups in the molecule generally increasing as the ratio of oxide to glycol increases. Examples of glycols include ethylene glycol, propylene glycol and butylene glycol, and exemplary of the alkylene oxides are ethylene oxide, propylene oxide, butylene oxide, amylene oxide, and tetrahydrofuran. The diolesters often are esters of dicarboxylic acids and diols, especially the glycols previously exemplified. Most typically, such products are esters of linear or aromatic dicarboxylic acids, such as succinic, glutaric, adipic, pimelic, suberic, azelaic, sebacic, phthalic, terephthalic, isophthalic acids, and so on. But it needs to be stressed again that the structures cited above are merely illustrative and exemplary of the diisocyanates and diols which may be used in making a urethane prepolymer, and are not intended to be exhaustive.

The ratio of reactants used in preparing the prepolymer is generally expressed in terms of relative numbers of isocyanate and hydroxyl groups, respectively. In this context, an equivalent amount of isocyanate and diol contains an equal number of isocyanate and hydroxyl groups. The prepolymer may contain from about 1.5 to about 4.0 equivalents of diisocyanate relative to diol, but most commonly there are about 2 equivalents diisocyanate per diol.

The polyurethane elastomer is made by reacting the prepolymer with a largely alkylated aromatic polyamine of the structure,

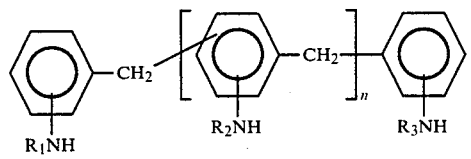

where n is an integer from 1 to about 10, $R_1$ and $R_3$ are alkyl or alkenyl groups, and $R_2$ is either hydrogen, alkyl, or an alkenyl group. These polyamines may be viewed as low polymers with the repeating structural unit of x-amino-y-methylenephenyl, where y is 3 or 4, and where x=2, 4, 5, or 6 when y=3, and x=2 or 3 when y=4.

Both $R_1$ and $R_3$ are alkyl or alkenyl moieties—i.e., a monovalent radical whose parent is a linear or branched alkane or alkene—which are independently selected from the group consisting of alkyl or alkenyl moieties containing from 1 up to about 20 carbon atoms, and more preferably between 1 and about 10 carbon atoms. The $R_2$ group is either hydrogen or an alkyl or alkenyl moiety from the same group from which $R_1$ and $R_3$ are selected. The alkyl or alkenyl group may be a primary, secondary, or tertiary group, although when it is tertiary there is the risk that cure time may be too long to be commercially acceptable. Secondary alkyl or alkenyl groups are preferred, and among these the secondary butyl group is particularly preferred. Examples of alkyl groups which may be used in the practice of this invention include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl moieties. Examples of alkenyl groups are the unsaturated counterparts of the aforementioned alkyl groups. As stated previously, secondary alkyl or alkenyl groups, i.e., those branched at the carbon atom bound to the nitrogen atom, and secondary alkyl groups in particular, are preferred in the practice of this invention. Representative of such groups are 2-propyl, 2-butyl, 2-pentyl, 3-pentyl, 2-hexyl, and so forth.

The polyamine curing agents of this invention are at least about 67% alkylated, with polyamines which are at least 90% alkylated being even more desirable. What is meant by, for example, the term "67% alkylated" is that 67%, or two-thirds, of the amino groups in the polyamine are alkylated. It has been found that if the degree of alkylation is too low the polyamine is glassy, whereas the viscous liquid which is characteristic of higher alkylation is desired for ease of handling. The alkylated polyamines of this invention typically are prepared by conventional alkylation procedures performed on the precursor primary amine. Largely because of steric factors the terminal amino groups are preferentially alkylated. Therefore, where there is less than total alkylation the internal amino groups of the polyamine are less likely to be alkylated than the terminal amino groups. Thus, for example, where the amine is 67% alkylated and n is 1 the polyamine will consist largely of a product where both terminal amino groups are monoalkylated and the internal amino group is not alkylated.

As previously stated n is an integer from 1 to about 10, but for ease of preparation and availability polyamines where n is 1 or 2 are materials of choice. Whatever the value of n, the terminal amino groups may be at either the 2, 3, or 4 position in the polyamine. However, it is desirable that at least 1 of the terminal amino groups be at the 4 position, and even more desirable that both occupy the 4-position. A major advantage arises from the ease of synthesis of such materials, although it is not to be implied that there are no differences in such materials as curing agents. Analogously, polyamines where y is 3 are preferred because of their relative availability.

Defining an equivalent of polyamine as an amount which furnishes as many amino groups as there are isocyanate groups in the urethane prepolymer, from about 0.80 to about 1.2 equivalents of polyamine are used in curing, with the range from about 0.85 to about 1.1 being the more usual one. Since each molecule of polyamine has at least 3 amino groups, none of which are tertiary, the polyamines of this invention may act both as chain extenders and as crosslinkers. It is to be understood that the curing mix may contain other materials, including crosslinkers such as polyols, in addition to, or partly replacing, the polyamines of this invention, although the presence of such materials is not necessary to the success of this invention.

The initial reaction between the urethane prepolymer and the polyamine is carried out between about 75° and about 120° C. The temperature is chosen, in part, in order to afford a convenient pot life, i.e., the time interval from mixing the polyamine and urethane prepolymer until the mixture is very difficult to pour. The elastomers are then cured to a tack-free state by heating at the same temperature range for an additional period from about 2 to about 24 hours.

The following examples are merely illustrative of this invention which is not to be limited thereto. In particular, the use of any particular polyamine is to be construed only as representative of the polyamines of this invention. In polymer characterization several standard ASTM tests were used as follows: hardness, D2240, types A and D; tear resistance, D624, die C; tensile strength, D412, die C; modulus, D412, die C; elongation at break, D412, die C; compression set, D395, method B.

EXAMPLE 1

Preparation of alkylated polyamines. The following procedure is representative of that which may be used in the preparation of the alkylated polyamines of this invention. To an 850 ml pyrex autoclave liner was added 87.5 g (0.29 moles) of a polyamine mixture consisting largely (70–80%) of 2,4-bis-p-aminobenzylaniline, 15 g of a sulfided platinum on alumina catalyst (0.375% platinum and 0.1% sulfur), and 123.1 g (1.71 moles) methyl ethyl ketone. The liner was sealed in an Ipatieff rotating autoclave, pressured to 200 psig nitrogen, and vented. The reaction mixture was then heated at 150° C. under 1500 psig hydrogen pressure for 8 hours. After the reaction mixture had cooled, the autoclave was vented and the liner removed. The catalyst was removed by filtration, the solvents were removed with the aid of a rotary evaporator under vacuum, and the residue was used as the polyalkylated polyamine curing agent. Determination of the degree of alkylation by NMR showed that the product obtained above was 92% alkylated.

Alkylation can be performed either in a batch reaction, as described, or in a continuous mode, as by using a fixed bed. The degree of alkylation may be controlled when using a batch reaction by varying either reaction time or the amount of ketone used. The degree of alkylation in a fixed bed is most conveniently controlled by varying the space velocity. In the examples which follow the alkylated polyamine was prepared from material which was a mixture of polyamines with the following composition: n=0, 3–10%; n=1, 70–80%; n=2, 10–25%; n greater than 2, 1%.

The average molecular weight, average amine number, and average functionality of the alkylated polyamines was determined from high pressure liquid chromatography. The average functionality of the polyamines refers to the average number of amino groups present per molecule, irrespective of the degree of alkylation. Quite briefly, mixtures were separated on an Alltech C-18 reversed phase column using methanol as the eluant, although other eluants, such as aqueous acetonitrile mixtures, also could be used. Initial component identification of the various peaks were made using mass spectrometry, and each peak was characterized as to molecular weight, number of amine groups, and number of alkyl groups present. Knowing the identity of the compound associated with each peak, the average molecular weight, amine number and functionality could be calculated from the weight percent of each peak obtained upon liquid chromatographic separation of any mixture.

The degree of alkylation as determined by proton NMR refers to the relative percent of amino groups which are alkylated. The aromatic region from 6.4–7.0 ppm represents all the aromatic protons to be found in the polyamines, and absorption in the region from about 0.6–2.0 ppm is that due to the alkyl protons other than those on the carbon bonded to nitrogen. Both regions are free from overlap of absorption arising from other kinds of protons. Therefore integration of the signals in these regions affords a ratio, R(o), which is the ratio of alkyl to aromatic protons. For tri-s-butylated triamine the theoretical ratio, R(t), is 2.185. The ratio, R(o)/R(t), is then taken as the total degree of alkylation which has occurred. The small deviations arising from the presence of diamine and tetraamine in the mixture are not taken into account by this method.

EXAMPLE 2

Effect of stoichiometry on polyurethane properties. A urethane prepolymer which was a TDI-ether product with 6.25% terminal isocyanate groups was cured with various stoichiometries of a polyamine of average molecule weight 424, average functionality 2.9, and which was 90% alkylated with sec-butyl groups. The curing agent and prepolymer were mixed at 100° C., cured for 17 hours at the same temperature, then postcured for 2 weeks at ambient temperature. Some results are summarized in the following table.

TABLE 1
Stoichiometry Study Using a TDI-Ether Prepolymer

| Stochiometry | Hardness | Tear Resistance | Tensile Strength | modulus, psi | | Elongation at Break | Compression Set |
|---|---|---|---|---|---|---|---|
| % | Shore A | pli | psi | 100% | 200% | % | % |
| 82 | 72 | 139 | 4276 | 583 | 1481 | 250 | 15 |
| 93 | 72 | 128 | 4554 | 496 | 1360 | 275 | 18 |
| 97 | 71 | 133 | 3749 | 448 | 1099 | 275 | 18 |
| 102 | 72 | 155 | 5028 | 507 | 1240 | 275 | 16 |
| 114 | 74 | 142 | 4611 | 435 | 1067 | 275 | 20 |

These results demonstrate quite clearly that most of the polymer properties vary only gradually around the optimum stoichiometry, which in this case appears to be near 102%. It can be appreciated that this is a highly desirable characteristic for any polymer formulation.

EXAMPLE 3

Blend of alkylated diamine and alkylated polyamine as curing agent. Mixtures of N,N'-di-sec-butyl-4,4'-methylenedianiline and the alkylated polyamine of the prior example were used as curing agents for the prepolymer of the prior example under conditions described there. Properties of the resulting polyurethane are tabulated below.

TABLE 2
Blend Study Using N,N'di-sec-Butyl-4,4'-Methylenedianiline and sec-Butylated Polyamine With a TDI-Ether Prepolymer

| Diamine wt. % | Polyamine wt. % | Hardness Shore A | Tear Resistance pli | Tensile Strength psi % | modulus, psi | | | Elongation at Break % | Compression Set % |
|---|---|---|---|---|---|---|---|---|---|
| | | | | | 100% | 200% | 300% | | |
| 100 | 0 | 62 | 143 | 3729 | 245 | 335 | 457 | 513 | 87 |
| 90 | 10 | 64 | 149 | 3183 | 235 | 329 | 446 | 550 | 64 |
| 70 | 30 | 66 | 146 | 3163 | 300 | 476 | 784 | 425 | 42 |
| 50 | 50 | 68 | 152 | 3451 | 326 | 525 | 1123 | 375 | 36 |
| 30 | 70 | 71 | 135 | 2792 | 329 | 697 | 2792 | 300 | 26 |
| 0 | 100 | 72 | 128 | 4554 | 496 | 1360 | — | 275 | 18 |

The above data demonstrate the rather dramatic increase in tensile strength and decrease in compression set associated with replacement of the diamine with a polyamine of this invention.

EXAMPLE 4

The properties of various polyurethanes prepared by curing several urethane prepolymers with some of the polyamines of this invention were determined and are summarized in the following table.

TABLE 3
Properties of Some Polyurethanes Using Polyamine Curatives

| Prepolymer | TDI-ester | TDI-ether | TDI-ester | MDI-ether |
|---|---|---|---|---|
| % NCO | 6.56 | 6.25 | 6.56 | 9.0 |
| Curing Agent | | | | |
| ave. mol. wt. | 389 | 424 | 424 | 389 |
| ave. functionality | 2.5 | 2.9 | 2.9 | 2.5 |
| % alkylation | 92 | 90 | 90 | 92 |
| % stoichiometry | 101 | 97 | 93 | 93 |
| Mixing Temperature, °C. | 100 | 100 | 100 | 100 |
| Working life at mixing T, min | 10 | 12 | 7 | 1 |
| Cure Temperature, °C. | 100 | 100 | 100 | 100 |
| Cure Time, hrs. | 17 | 17 | 17 | 17 |
| Hardness, | | | | |
| durometer A | 99 | 70 | 97 | 99 |
| durometer D | 60 | 26 | 60 | 63 |
| 100% Modulus, psi (MPa) | 1710(11.8) | 448(3.1) | 1619(11.2) | 2486(17.1) |
| 200% Modulus, psi (MPa) | 2806(19.3) | 1099(7.6) | 3190(22.0) | |
| 300% Modulus, psi (MPa) | 5642(38.9) | | | |
| Tensile Strength, psi (MPa) | 7053(48.6) | 3749(25.8) | 5008(34.5) | 4425(30.5) |
| Elongation, % | 325 | 275 | 238 | 188 |
| Tear Resistance, pli (KN/m) | 648(113.4) | 133(23.3) | 445(77.9) | 487(85.2) |
| Compression set after 22 hrs. at 70° C. | 28 | 26 | 21 | 35 |

What is claimed is:

1. A polyurethane resulting from the reaction of an isocyanate-terminated urethane prepolymer, said prepolymer being the adduct of from about 1.5 to about 4.0 equivalents of a polyisocyanate with 1 equivalent of a polyol, with from about 0.80 to 1.2 equivalents of an alkylated aromatic polyamine of the structure,

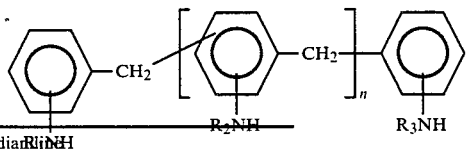

where $R_1$ and $R_3$ are independently selected from the group consisting of an alkyl or alkenyl moiety containing from 1 to about 20 carbon atoms, and $R_2$ is hydrogen, alkyl, or an alkenyl moiety containing from 1 to about 20 carbon atoms, and where n is an integer from 1 to about 10.

2. The polyurethane of claim 1 where the prepolymer is an adduct of a diisocyanate and a dihydric alcohol.

3. The polyurethane of claim 2 where the diisocyanate is toluene diisocyanate or methylenediphenyl isocyanate.

4. The polyurethane of claim 1 where at least about 67% of the amino groups of the polyamine are alkylated.

5. The polyurethane of claim 4 where at least 90% of the amino groups are alkylated.

6. The polyurethane of claim 1 where n is 1 or 2.

7. The polyurethane of claim 1 where the alkyl or alkenyl moiety contains from 1 to about 10 carbon atoms.

8. The polyurethane of claim 1 where the moiety is an alkyl moiety.

9. The polyurethane of claim 8 where the alkyl moiety is a secondary alkyl moiety.

10. The polyurethane of claim 9 where the alkyl moiety is isopropyl or sec-butyl.

11. The polyurethane of claim 1 where at least 1 of the terminal amino groups is at the 4-position of the aromatic ring.

12. The polyurethane of claim 11 where both of the terminal amino groups are at the 4-position of the aromatic ring.

13. The polyurethane of claim 1 where at least 90% of the amino groups are alkylated, the alkyl moiety being a sec-butyl moiety, n is 1, and both terminal amino groups are at the 4-position of the aromatic ring.

14. A method of curing a polyurethane prepolymer comprising reacting an isocyanate-terminated urethane prepolymer, said prepolymer being the adduct of from about 1.5 to about 4.0 equivalents of a polyisocyanate with 1 equivalent of a polyol, with from about 0.80 to 1.2 equivalents of an alkylated aromatic polyamine of the structure,

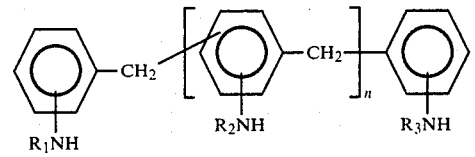

where $R_1$ and $R_3$ are independently selected from the group consisting of an alkyl or alkenyl moiety containing from 1 to about 20 carbon atoms, and $R_2$ is hydrogen, alkyl, or an alkenyl moiety containing from 1 to about 20 carbon atoms, and where n is an integer from 1 to about 10.

15. The method of claim 14 where the prepolymer is an adduct of a diisocyanate and a dihydric alcohol.

16. The method of claim 15 where the diisocyanate is toluene diisocyanate or methylenediphenyl isocyanate.

17. The method of claim 14 where at least about 67% of the amino groups of the polyamine are alkylated.

18. The method of claim 17 where at least 90% of the amino groups are alkylated.

19. The method of claim 14 where n is 1 or 2.

20. The method of claim 14 where the alkyl or alkenyl moiety contains from 1 to about 10 carbon atoms.

21. The method of claim 14 where the moiety is an alkyl moiety.

22. The method of claim 21 where the alkyl moiety is a secondary alkyl moiety.

23. The method of claim 22 where the prepolymer is an adduct of a diisocyanate and a dihydric alcohol.

24. The method of claim 14 where at least 1 of the terminal amino groups is at the 4-position of the aromatic ring.

25. The method of claim 24 where both of the terminal amino groups are at the 4-position of the aromatic ring.

26. The method of claim 14 where at least 90% of the amino groups are alkylated, the alkyl moiety being a sec-butyl moiety, n is 1, and both terminal amino groups are at the 4-position of the aromatic ring.

* * * * *